United States Patent
Kurita et al.

(10) Patent No.: US 11,280,231 B2
(45) Date of Patent: Mar. 22, 2022

(54) BALANCER APPARATUS EQUIPPED WITH OIL PUMP

(71) Applicant: HITACHI ASTEMO, LTD., Hitachinaka (JP)

(72) Inventors: Masahumi Kurita, Zama (JP); Takashi Hirano, Atsugi (JP); Masaharu Kitamura, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 192 days.

(21) Appl. No.: 16/650,192

(22) PCT Filed: Feb. 21, 2020

(86) PCT No.: PCT/JP2020/006970
§ 371 (c)(1),
(2) Date: Mar. 24, 2020

(87) PCT Pub. No.: WO2021/053848
PCT Pub. Date: Mar. 25, 2021

(65) Prior Publication Data
US 2021/0396165 A1 Dec. 23, 2021

(30) Foreign Application Priority Data

Sep. 18, 2019 (JP) .............................. JP2019-169208

(51) Int. Cl.
*F01M 11/02* (2006.01)
*F01M 1/02* (2006.01)

(52) U.S. Cl.
CPC .............. *F01M 1/02* (2013.01); *F01M 11/02* (2013.01); *F01M 2001/0276* (2013.01); *F01M 2011/028* (2013.01)

(58) Field of Classification Search
CPC ........... F01M 2001/0276; F01M 11/02; F01M 2001/0284; F16F 15/265; F16F 15/267; F16F 15/264
See application file for complete search history.

(56) References Cited

U.S. PATENT DOCUMENTS

| | | | | |
|---|---|---|---|---|
| 2008/0047521 A1* | 2/2008 | Koyama | ............ | F01M 11/0004 123/196 A |
| 2012/0227702 A1* | 9/2012 | Bicker | .................. | F01M 11/02 123/196 CP |
| 2013/0146015 A1* | 6/2013 | Akaishi | ..................... | F16F 7/10 123/192.2 |

FOREIGN PATENT DOCUMENTS

JP 2016142220 A * 8/2016

* cited by examiner

*Primary Examiner* — George C Jin
*Assistant Examiner* — Teuta B Holbrook
(74) *Attorney, Agent, or Firm* — Foley & Lardner LLP

(57) ABSTRACT

A balancer apparatus equipped with an oil pump includes a pump housing including a pump containing chamber provided therein, a pump forming member contained in the pump containing chamber and configured to discharge oil introduced from an intake portion from a discharge portion to an oil passage of the internal combustion engine when a rotational force is transmitted thereto, a control oil chamber provided between the pump containing chamber and the pump forming member in a radial direction with respect to a rotational axis of the pump forming member and configured to change a hydraulic pressure of the oil to be discharged from the pump forming member with the aid of the oil introduced therein after being discharged from the discharge portion, passing through an oil passage of the internal combustion engine, and being subjected to a pressure adjustment, and a balancer housing including a bearing retainer portion configured to transmit the rotational force from the internal combustion engine to the pump forming member. The bearing retainer portion supports a balancer shaft disposed along the rotational axis of the pump forming member. The balancer housing is attached to the pump housing in a direction of the rotational axis of the pump forming member. The balancer apparatus equipped with the oil pump further includes a plurality of oil passage opening portions formed together on one side surface of the balancer housing and each connected to an oil passage connected to a main oil (Continued)

gallery of the internal combustion engine. The plurality of oil passage opening portions includes a discharge oil passage opening portion of a discharge oil passage connecting the discharge portion and the main oil gallery of the internal combustion engine to each other, a feedback oil passage opening portion of a feedback oil passage connecting the main oil gallery of the internal combustion engine and the control oil chamber to each other, and a bearing oil passage opening portion of a bearing oil passage connecting the main oil gallery of the internal combustion engine and the bearing retainer portion to each other.

12 Claims, 13 Drawing Sheets

BALANCER APPARATUS EQUIPPED WITH OIL PUMP

TECHNICAL FIELD

The present invention relates to a balancer apparatus equipped with an oil pump.

BACKGROUND ART

PTL 1 discusses a balancer apparatus equipped with an oil pump. The balancer apparatus includes each of a discharge oil passage connection portion and a feedback oil passage connection portion on an oil pump side, and a bearing lubrication oil passage connection portion on a balancer apparatus side. Oil is discharged from the discharge oil passage connection portion. The feedback oil passage connection portion is used to return the oil discharged from the discharge oil passage connection portion to the oil pump via an oil passage provided in the internal combustion engine. The bearing lubrication oil passage connection portion is used to supply the oil discharged from the discharge oil passage to a bearing portion of a rotational shaft of the balancer apparatus via an oil passage provided in the internal combustion engine.

CITATION LIST

Patent Literature

[PTL 1] International Publication No. 2017-141917

SUMMARY OF INVENTION

Technical Problem

However, the balancer apparatus equipped with the oil pump disclosed in PTL 1 has such a problem that the discharge oil passage connection portion, the feedback oil passage connection portion, and the bearing lubrication oil passage connection portion are located at different positions from one another, and this layout makes it complicated to connect them to the oil passages provided in the internal combustion engine.

One of the objects of the present invention is to provide a balancer apparatus equipped with an oil pump that can facilitate the connections to the oil passages provided in the internal combustion engine.

Solution to Problem

According to one aspect of the present invention, a balancer apparatus equipped with an oil pump includes a pump housing including a pump containing chamber provided therein, a pump forming member contained in the pump containing chamber and configured to discharge oil introduced from an intake portion from a discharge portion to an oil passage of the internal combustion engine when a rotational force is transmitted thereto, a control oil chamber provided between the pump containing chamber and the pump forming member in a radial direction with respect to a rotational axis of the pump forming member and configured to change a hydraulic pressure of the oil to be discharged from the pump forming member with the aid of the oil introduced therein after being discharged from the discharge portion, passing through an oil passage of the internal combustion engine, and being subjected to a pressure adjustment, and a balancer housing including a bearing retainer portion configured to transmit the rotational force from the internal combustion engine to the pump forming member. The bearing retainer portion supports a balancer shaft disposed along the rotational axis of the pump forming member. The balancer housing is attached to the pump housing in a direction of the rotational axis of the pump forming member. The balancer apparatus equipped with the oil pump further includes a plurality of oil passage opening portions formed together on one side surface of the balancer housing and each connected to an oil passage connected to a main oil gallery of the internal combustion engine. The plurality of oil passage opening portions includes a discharge oil passage opening portion of a discharge oil passage connecting the discharge portion and the main oil gallery of the internal combustion engine to each other, a feedback oil passage opening portion of a feedback oil passage connecting the main oil gallery of the internal combustion engine and the control oil chamber to each other, and a bearing oil passage opening portion of a bearing oil passage connecting the main oil gallery of the internal combustion engine and the bearing retainer portion to each other.

Therefore, the balancer apparatus equipped with the oil pump according to the one aspect of the present invention can facilitate the connections to the oil passages provided in the internal combustion engine.

DESCRIPTION OF EMBODIMENTS

Figure 1:
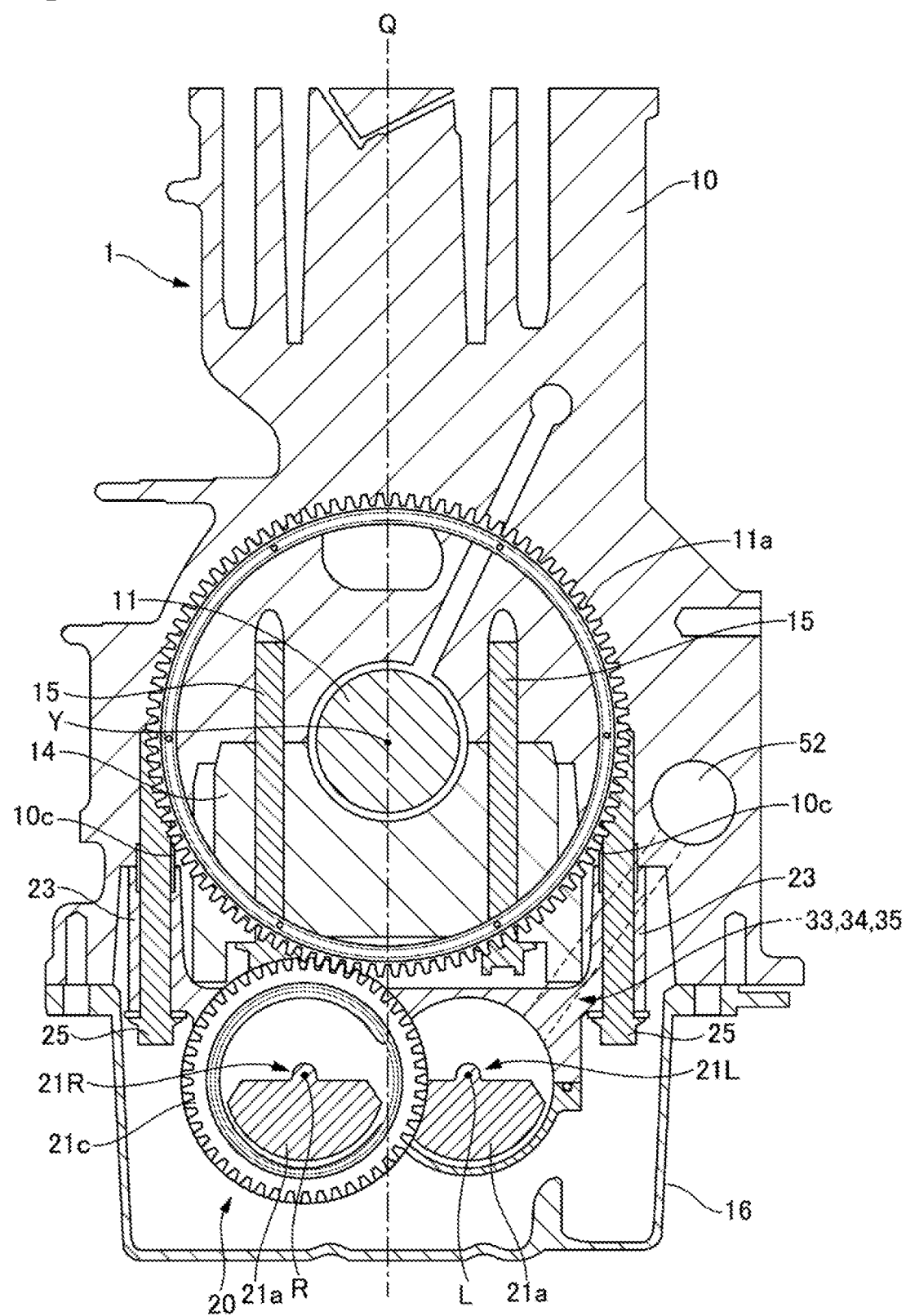
FIG. 1 is a front cross-sectional view of an internal combustion engine and a balancer apparatus according to a first embodiment.
Figure 2:
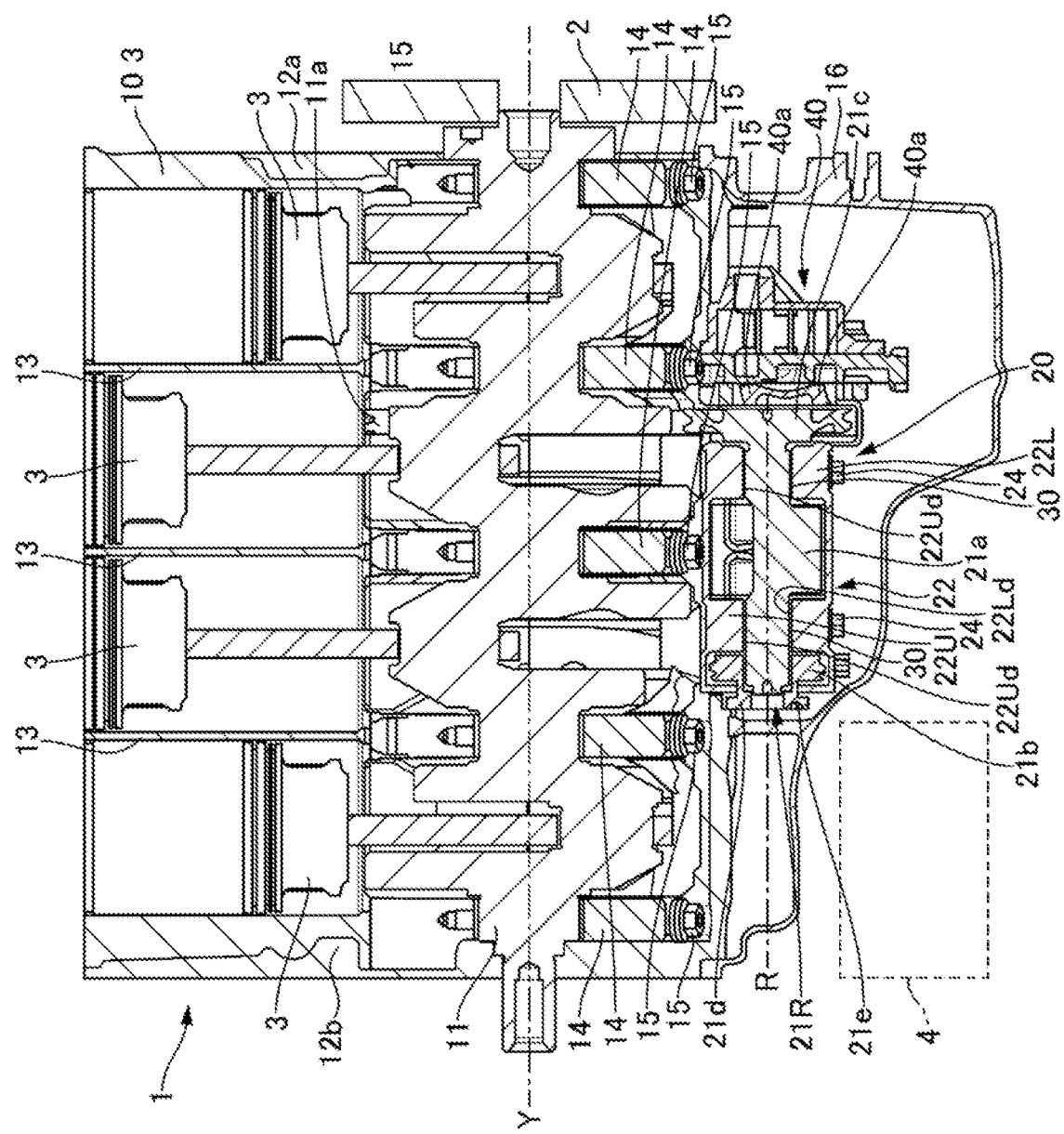
FIG. 2 is a side cross-sectional view of the internal combustion engine and the balancer apparatus according to the first embodiment.

[First Embodiment] FIG. 1 is a front cross-sectional view of an internal combustion engine and a balancer apparatus according to a first embodiment. FIG. 2 is a side cross-sectional view of the internal combustion engine and the balancer apparatus according to the first embodiment.

The internal combustion engine 1 includes a cylinder block 10.

The cylinder block 10 includes four pistons 3 disposed between three inter-cylinder vertical wall portions 13, between a side-surface vertical wall portion 12a on a flywheel 2 side and a side-surface vertical wall portion 12b on an opposite side.

In other words, the internal combustion engine 1 is an in-line four-cylinder internal combustion engine, and the cylinder block 10 is made from an aluminum alloy.

The four pistons 3 are rotatably supported on a rotatably supported crankshaft 11 via the cylinder block 10 and five bearing caps 14 fastened to the cylinder block 10 with use of a plurality of bolts 15, and are configured in such a manner that movements of the four pistons 3 in a vertical direction in FIGS. 1 and 2 are transmitted as a rotation of the crankshaft 11.

A balancer apparatus 20 is housed in an oil pan 16 located below the internal combustion engine 1.

The balancer apparatus 20 includes a first balancer shaft 21R, a second balancer shaft 21L, and a balancer housing 22. The first balancer shaft 21R is disposed on an opposite side of a left-right central axis Q of the internal combustion engine 1 from a main oil gallery 52, and includes a driven gear 21c meshed with a driving gear 11a provided on the crankshaft 11, an interlocking gear 21b, and a weight portion 21a having a center of gravity offset from a rotational axis R. The second balancer shaft 21L is disposed on the main oil gallery 52 side of the left-right central axis Q of the internal combustion engine 1, and includes an interlocking gear 21b1 meshed with the interlocking gear 21b, which will be describe below, a weight portion 21a having a center of gravity offset from a rotational axis L, and a pinion gear 42 for driving the pump (refer to FIG. 5). The balancer housing 22 rotatably supports the first balancer shaft 21R and the second balancer shaft 21L, and is formed so as to surround the entire circumference of the weight 21a of each of the balancer shafts 21R and 21R.

The balancer housing 22 includes an upper-side balancer housing member 22U and a lower-side balancer housing member 22L, which are in abutment with each other on an abutment surface 22Le and are fixed with use of bolts 24.

Each of the balancer shafts 21R and 21L extend in parallel with the crankshaft 11, and the rotational axis R of the first balancer shaft 21R and the rotational axis L of the second balancer shaft 21L are arranged symmetrically in the left-right direction with respect to a perpendicular surface passing through a rotational axis Y of the crankshaft 11 within the same horizontal surface.

The balancer housing 22 is fixed to the cylinder block 10 with use of a plurality of bolts 25 threadably engaged with a plurality of mounting holes 10c formed on a bottom surface of the cylinder block 10.

Due to this configuration, each of the balancer shafts 21R and 21L is rotationally driven in synchronization with the crankshaft 11 by the driven gear 21c meshed with the driving gear 11a provided on the crankshaft 11 and the interlocking gear 21b1 meshed with the interlocking gear 21b.

As will be described in detail below, a bearing lubrication oil passage opening portion 33a of a bearing lubrication oil passage 33, a feedback oil passage opening portion 34a of a feedback oil passage 34, and a discharge oil passage opening portion 35a of a discharge oil passage 35 of an oil pump 40 are formed together on the balancer housing 22 on the second balancer shaft 21L side closer to the main oil gallery 52.

Figure 4:
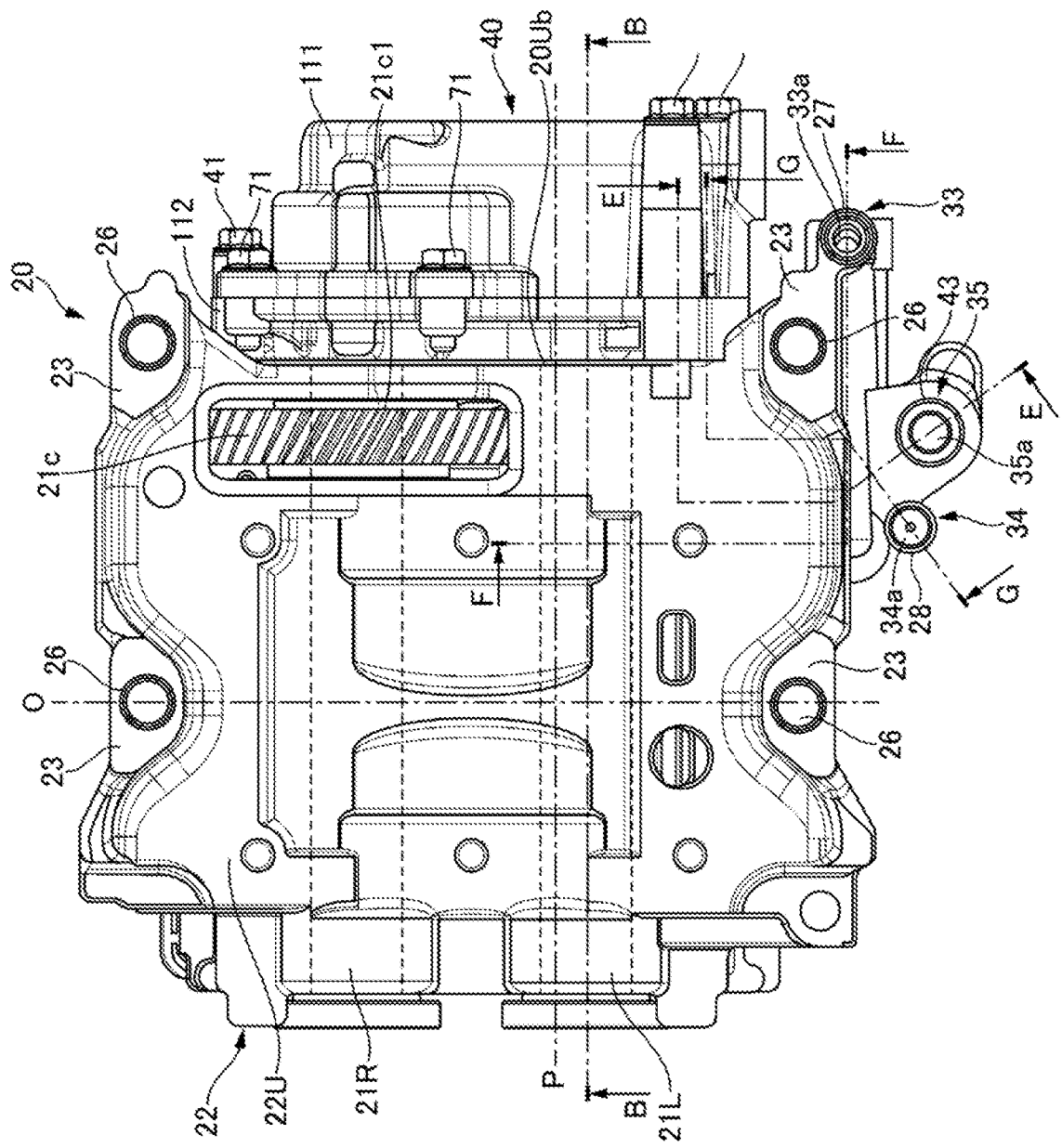
FIG. 4 is a plan view of the balancer apparatus according to the first embodiment.

In other words, as illustrated in FIG. 4, which will be described below, the bearing lubrication oil passage opening portion 33a of the bearing lubrication oil passage 33, the feedback oil passage opening portion 34a of the feedback oil passage 34, and the discharge oil passage opening portion 35a of the discharge oil passage 35 of the oil pump 40 are provided together on one side surface of the balancer housing 22 in a radial direction with respect to a rotational axis P of a rotor 103, when the balancer housing 22 is viewed from the cylinder block 10, which is a part of the internal combustion engine 1.

In further other words, the bearing lubrication oil passage opening portion 33a of the bearing lubrication oil passage 33, the feedback oil passage opening portion 34a of the feedback oil passage 34, and the discharge oil passage opening portion 35a of the discharge oil passage 35 of the oil pump 40 are provided together on the balancer housing 22 toward the main oil gallery 52.

That is, unlike the balancer housing 22 on the first balancer shaft 21R side including the driven gear 21c meshed with the driving gear 11a provided on the crankshaft 11, the balancer housing 22 on the second balancer shaft 21L side closer to the main gallery 52 has a sufficiently wide space for forming the bearing lubrication oil passage opening portion 33a, the feedback oil passage opening portion 34a, and the discharge oil passage opening portion 35a, which facilitates the collective formation of the three opening portions, and further facilitates connections to holes 10d, 10e, and 10f (refer to FIGS. 8, 10, and 12) of oil passages provided in the internal combustion engine 1, corresponding to the bearing lubrication oil passage opening portion 33a, the feedback oil passage opening portion 34a, and the discharge oil passage opening portion 35a, and connected to the main oil gallery 52.

Further, as illustrated in FIG. 2, the oil pump 40 is disposed so as to extend over both the upper-side balancer housing member 22U and the lower-side balancer housing member 22L, and is mounted on the upper-side balancer housing member 22U, on the right side of the balancer housing 22 in FIG. 2.

The bearing lubrication oil passage opening portion 33a of the bearing lubrication oil passage 33, the feedback oil passage opening portion 34a of the feedback oil passage 34, and the discharge oil passage opening portion 35a of the discharge oil passage 35 of the oil pump 40 may be provided together on a side surface of the balancer apparatus 20 in the rotational axis P of the rotor 103, when the balancer housing 22 is viewed from the cylinder block 10, which is a part of the internal combustion engine 1.

Figure 3:
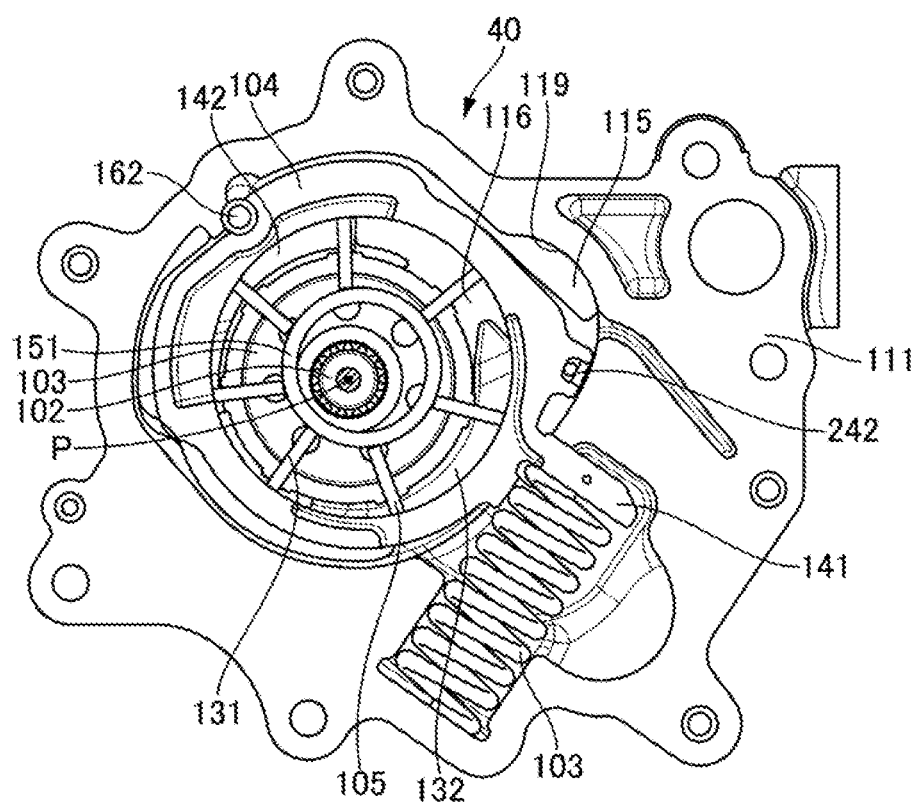
FIG. 3 illustrates an oil pump according to the first embodiment with a pump cover removed therefrom as viewed from a balancer apparatus side in a direction of a rotational axis of the oil pump.

FIG. 3 illustrates the oil pump according to the first embodiment with a pump cover removed therefrom as viewed from the balancer apparatus side in the direction of the rotational axis of the oil pump.

The oil pump 40 includes a recessed pump containing chamber 119 in a pump body 111.

The rotor (a pump forming member) 103 integrated with a pump shaft 102, and a cam ring (the pump forming member) 104 are disposed at an approximately central portion in the pump containing chamber 119. The cam ring 104 is disposed there with a center of an inner diameter thereof placed eccentrically from the rotational axis P of the rotor 103.

A driven gear 40a (refer to FIG. 2) mounted at an end portion of the pump shaft 102 integrated with the rotor 103 is meshed with the pinion gear 42 mounted at an end portion of the second balancer shaft 21L, by which the rotor 103 is driven rotationally around the rotational axis P.

The cam ring 104 is swingable with a pivot pin 162 serving as a support point therefor, and is pressed in the counterclockwise direction as viewed in FIG. 3 with an eccentricity amount thereof maximized within a set range due to a set load of a spring 106 disposed between an arm portion 141 and the pump containing chamber 119 in the pump body 111 in an initial state.

Further, a pump cover 112, which will be described below, is attached to the pump containing chamber 119 with use of bolts 71, and sealingly closes the pump containing chamber 119 (refer to FIG. 6).

Vanes (the pump forming member) 105 are disposed in a plurality of slits 131 provided on the rotor 103, respectively, and distal ends thereof slidably move on an inner peripheral surface of the cam ring 104 while projecting from and retracting into an outer diameter of the rotor 103 when the rotor 103 rotates.

The vanes 105 are supported by a vane ring 151 in such a manner that not all of them are retracted even at the time of a stop.

A pump chamber 116 increases and reduces in volume according to the rotation of the rotor 103 in the counterclockwise direction in FIG. 3. The pump chamber 116 is a space formed among an outer peripheral surface of the rotor 103, an inner peripheral surface of the cam ring 104, and the two vanes 105.

An intake port (an intake portion) 132 is provided on side surfaces of the pump body 111 and the pump cover 112 in a range where the pump chamber 116 increases in volume, and a discharge port (a discharge portion) 142 is provided on the side surfaces of the pump body 111 and the pump cover 112 in a range where the pump chamber 116 reduces in volume.

The intake port 132 sucks up oil from the oil pan 16, and the discharge port 142 discharges the oil to the main oil gallery 52 of the internal combustion engine 1, thereby exerting a pump function.

A theoretical discharge amount of the oil pump 40 is determined based on how much the volume of each pump chamber 116 changes (a volume difference between a maximum volume portion and a minimum volume portion), i.e., the eccentricity amount, and the theoretical discharge amount can be set variably according to the eccentricity amount.

A hydraulic control chamber 115 is formed by a space surrounded by an inner peripheral surface of the pump containing chamber 119 and an outer peripheral surface of the cam ring 104, the pivot pin 162, a seal portion 242, and a bottom portion of the pump body 111 and the pump cover 112 on surfaces of the rotor 103 on both sides in the direction of the rotational axis P.

The hydraulic pressure of the oil in the main oil gallery 52 is adjusted by a not-illustrated pressure adjustment valve, and is applied to the hydraulic control chamber 115 via the feedback oil passage 34, which will be described below. As a result, a hydraulic force is applied to the cam ring 104 in the clockwise direction in FIG. 3 with the pivot pin 162 serving as the support point therefor and adjusts the eccentricity amount according to balance with the biasing force of the spring 106.

In other words, an increase in the hydraulic pressure in the hydraulic control chamber 115 and thus an increase in the hydraulic force cause the cam ring 104 to move in the clockwise direction with the pivot pin 162 serving as the support point therefor against the biasing force of the spring 106, and therefore reduces the eccentricity amount and thus reduces the theoretical discharge amount, thereby preventing an excessive increase in the hydraulic pressure.

The hydraulic pressure of the oil in the main oil gallery 52 is monitored by a not-illustrated hydraulic sensor. A not-illustrated control unit calculates a required hydraulic pressure according to operation conditions such as a rotational speed, a load, an oil temperature, and a cooling water temperature of the internal combustion engine 1 and instructs the pressure adjustment valve, thereby performing feedback control on the hydraulic pressure steplessly and continuously to thus achieve improvement of the fuel efficiency.

Figure 5:
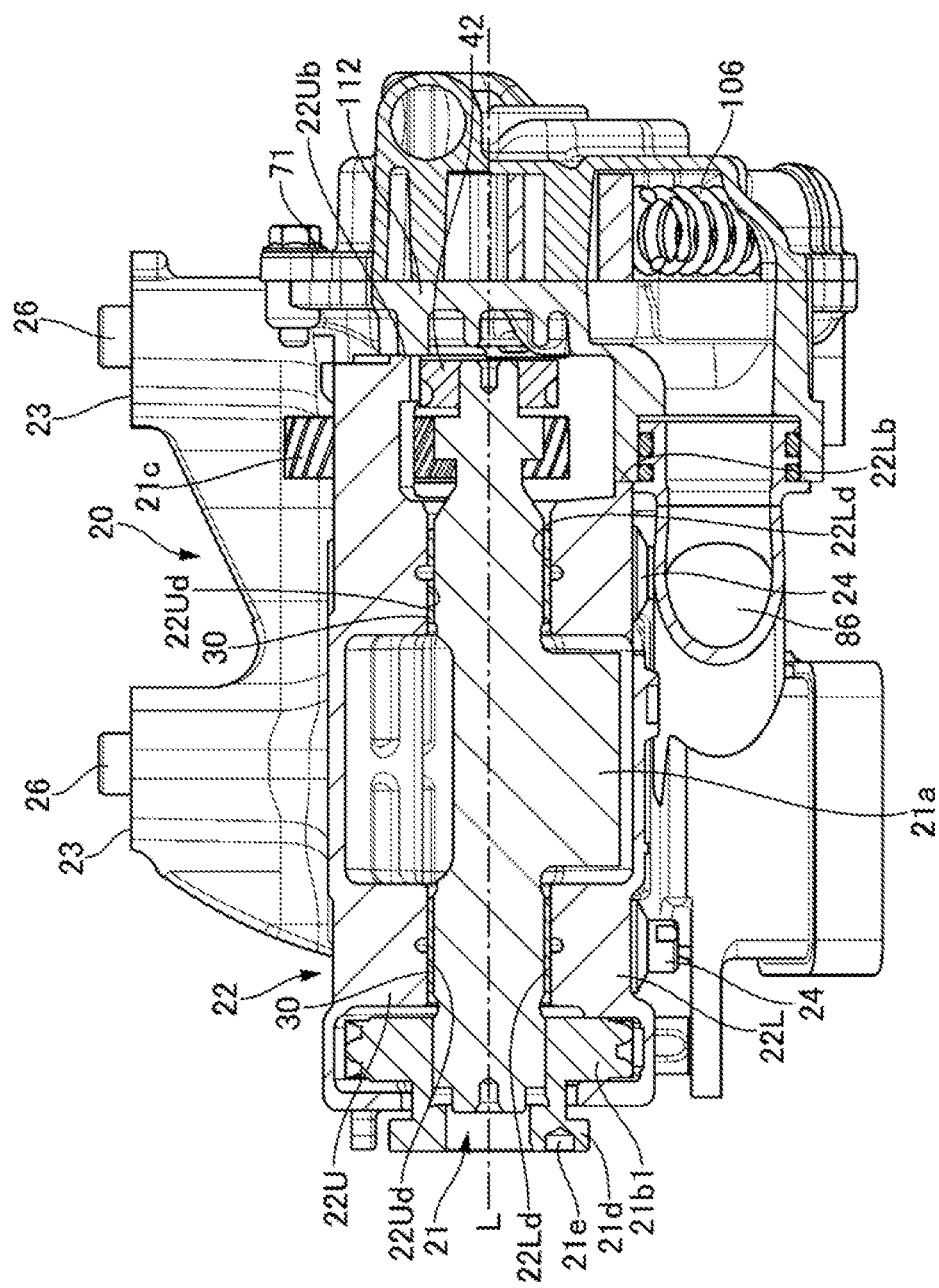
FIG. 5 is a cross-sectional view of the first embodiment taken along a line B-B in FIG. 4.
Figure 7:
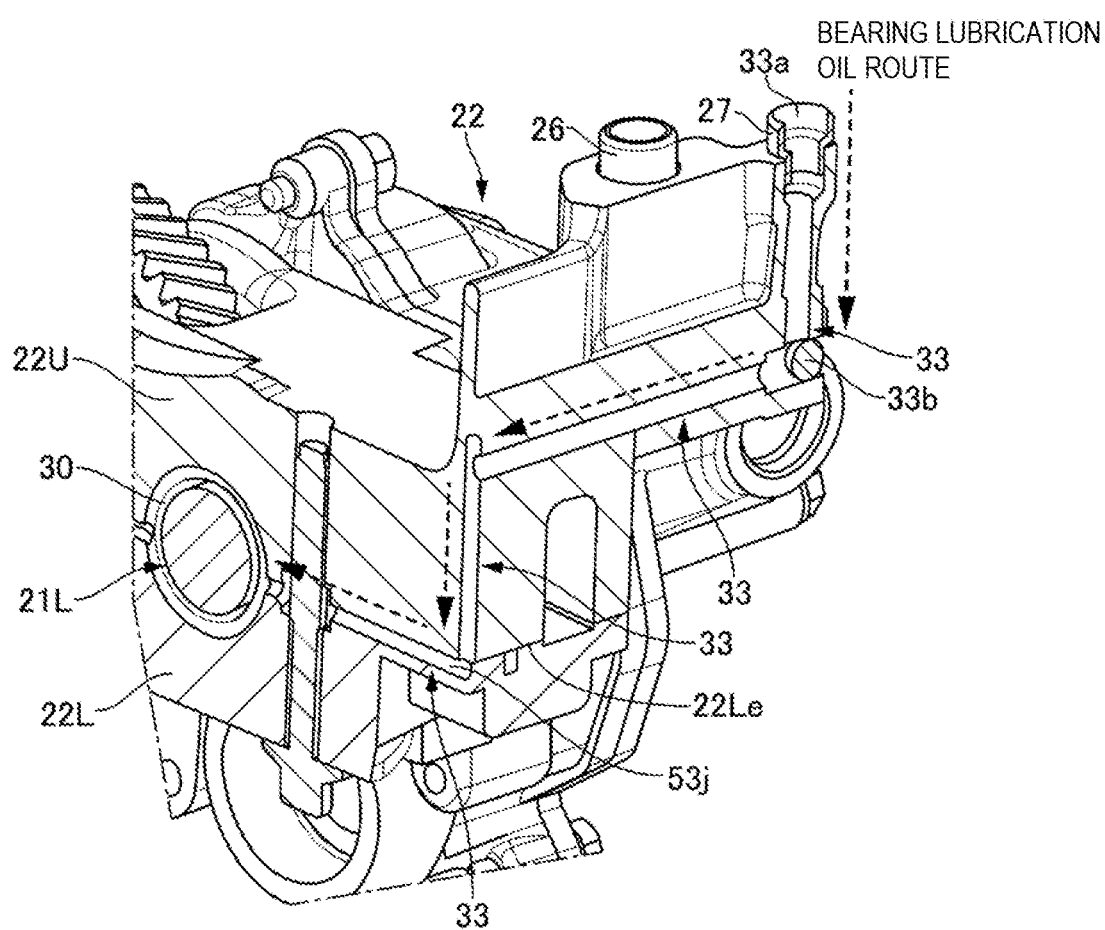
FIG. 7 is a cross-sectional perspective view of the first embodiment taken along a line F-F in FIG. 4.
Figure 8:
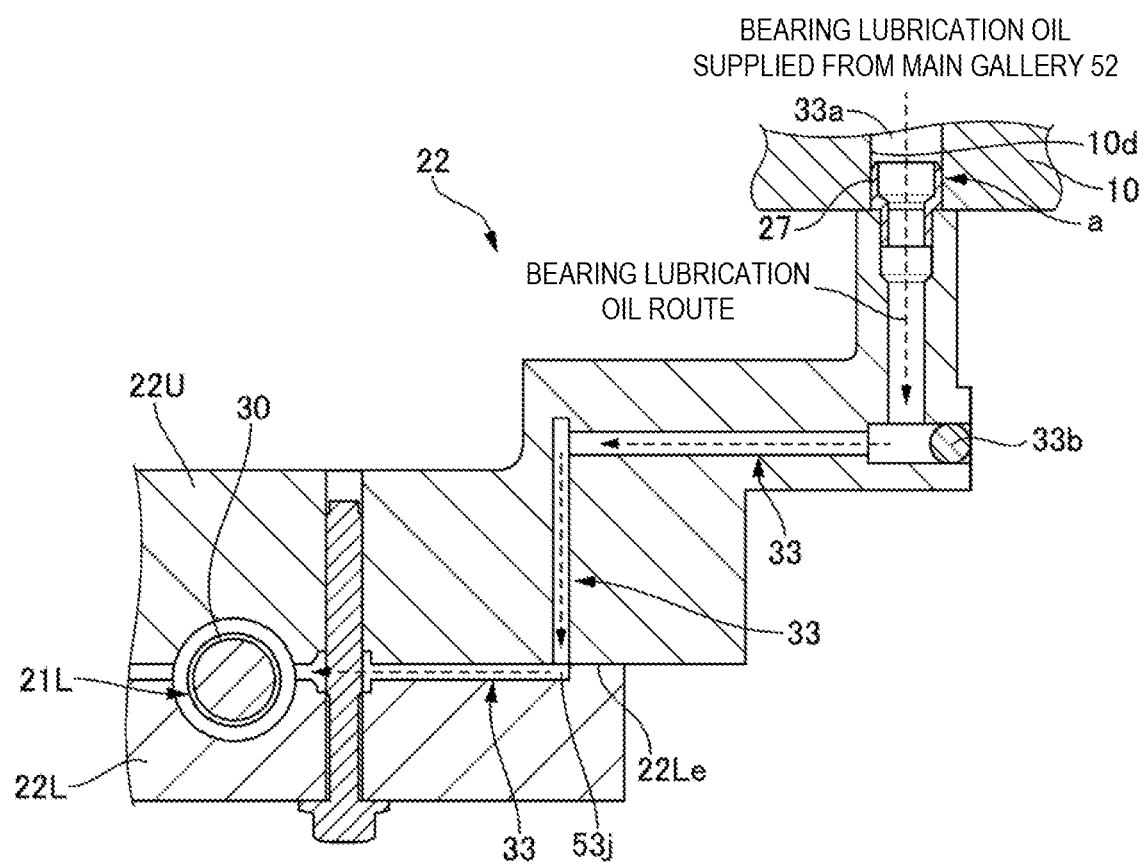
FIG. 8 is a cross-sectional view of the first embodiment taken along the line F-F in FIG. 4.
Figure 9:
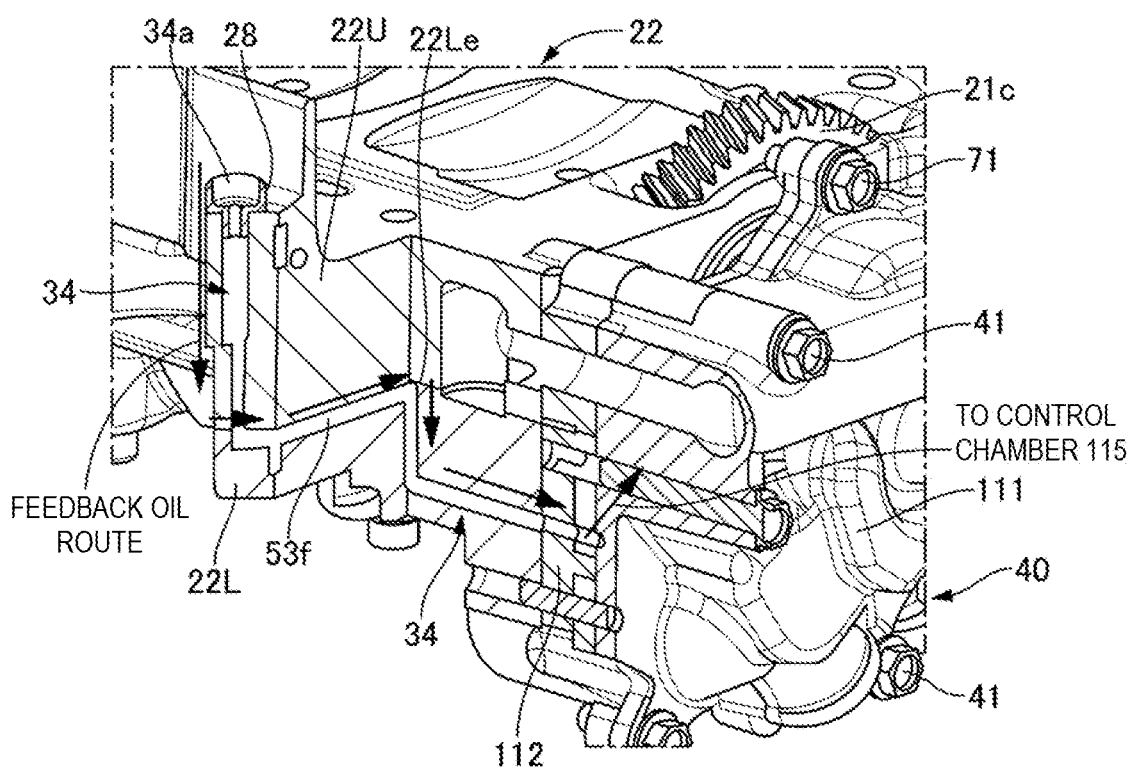
FIG. 9 is a cross-sectional perspective view of the first embodiment taken along a line G-G in FIG. 4.
Figure 10:
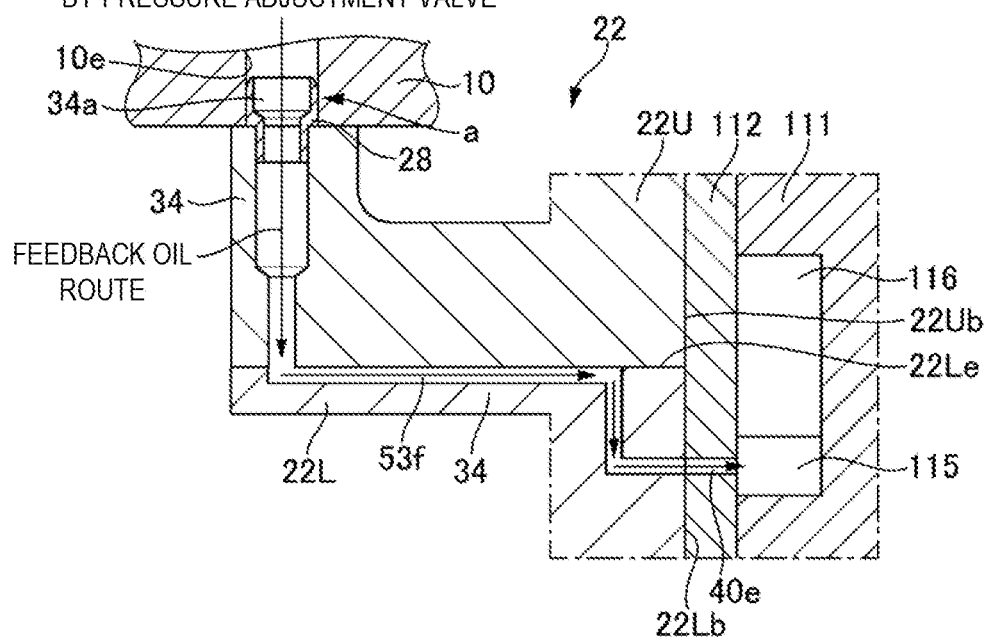
FIG. 10 is a cross-sectional view of the first embodiment taken along the line G-G in FIG. 4.
Figure 11:
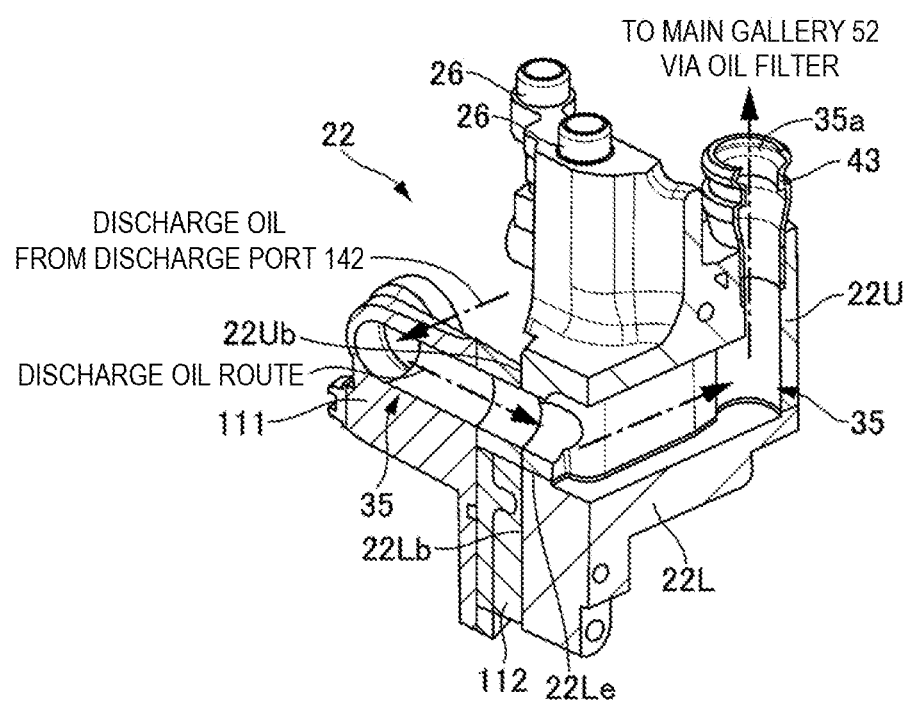
FIG. 11 is a cross-sectional perspective view of the first embodiment taken along a line E-E in FIG. 4.
Figure 12:
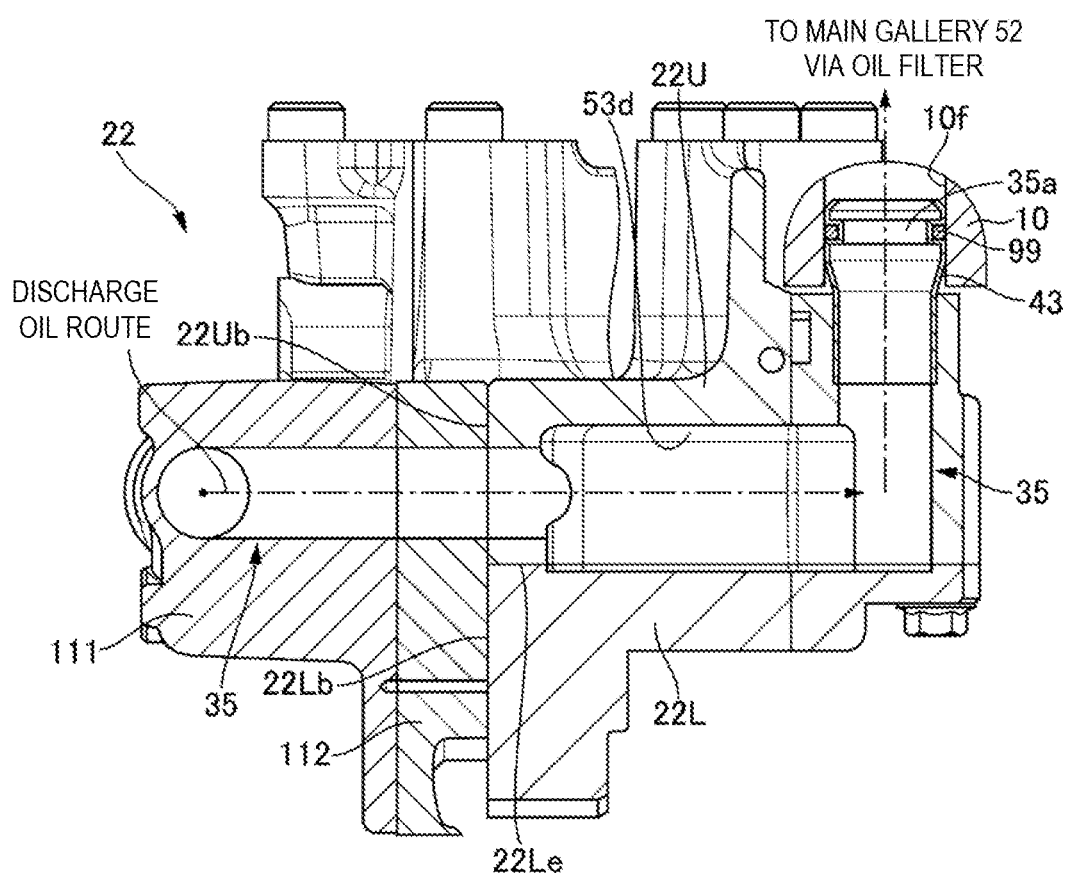
FIG. 12 is a cross-sectional view of the first embodiment taken along the line E-E in FIG. 4.

FIG. 4 is a plan view of the balancer apparatus according to the first embodiment. FIG. 5 is a cross-sectional view of the first embodiment taken along a line B-B in FIG. 4. FIG. 6 is a perspective view of the balancer apparatus according to the first embodiment. FIG. 7 is a cross-sectional perspective view of the first embodiment taken along a line F-F in FIG. 4. FIG. 8 is a cross-sectional view of the first embodiment taken along the line F-F in FIG. 4. FIG. 9 is a cross-sectional perspective view of the first embodiment taken along a line G-G in FIG. 4. FIG. 10 is a cross-sectional view of the first embodiment taken along the line G-G in FIG. 4. FIG. 11 is a cross-sectional perspective view of the first embodiment taken along a line E-E in FIG. 4. FIG. 12 is a cross-sectional view of the first embodiment taken along the line E-E in FIG. 4.

As described above, the balancer housing 22 includes two members, the upper-side balancer housing member 22U and the lower-side balancer housing member 22L, and the lower-side balancer housing member 22L is fixedly fastened to the upper-side balancer housing member 22U with use of the plurality of bolts 24 in abutment with the upper-side balancer housing member 22U on the abutment surface 22Le.

An end portion 21d of the interlocking gear 21b1 of the second balancer shaft 21L is exposed to outside the balancer housing 22.

The end portion 21d of the interlocking gear 21b1 is chucked or used as a spigot joint when a gear backlash or a transmission error is measured.

A reference hole 21e formed at the end portion 21d of the interlocking gear 21b1 is used to hold the second balancer shaft 21L so as to prevent it from rotating due to the gravitational force even when the balancer housing 20 is turned upside down until the balancer apparatus 20 is mounted on the cylinder block 10 with the aid of a not-illustrated positioning clip attached therein.

As illustrated in FIG. 2, the interlocking gear 21b of the first balancer shaft 21R also has a similar configuration and achieves a similar advantageous effect.

Further, as illustrated in FIG. 4, the balancer apparatus 20 includes the first balancer shaft 21R and the second balancer shaft 21L. The first balancer shaft 21R receives the rotational force of the crankshaft 11 provided in the internal combustion engine 1 that is transmitted via the driving gear 11a, and also includes the driven gear 21c meshed with the driving gear 11a provided on one side closer to an attachment surface 22Ub, where the pump cover 112 of the oil pump 40 and the upper-side balancer housing member 22U of the balancer housing 22 are attached to each other, with respect to a front-rear central axis O of the balancer housing 22 in the direction of the rotational axis P of the rotor 103 of the oil pump 40. The second balancer shaft 21L is disposed between the first balancer shaft 21R, and the bearing lubrication oil passage opening portion 33a of the bearing lubrication oil passage 33, the feedback oil passage opening portion 34a of the feedback oil passage 34, and the discharge oil passage opening portion 35a of the discharge oil passage 35 of the oil pump 40 in the radial direction with respect to the rotational axis P of the rotor 103 of the oil pump 40. The second balancer shaft 21L transmits the rotational force of the first balancer shaft 21R to the rotor 103 of the oil pump 40.

Further, the balancer apparatus 20 can be employed for a four-cylinder internal combustion engine by rotating the first balancer shaft 21R and the second balancer shaft 21L in opposite directions from each other at a double speed, and canceling out a centrifugal force in the left-right direction by the first balancer shaft 21R and the second balancer shaft 21R.

The second balancer shaft 21L is rotatably supported on the balancer housing 22 via two half-divided plain bearings (sliding bearings) 30 and 30 by a pair of bearing retainer portions 22Ud and 22Ud of the upper-side balancer housing member 22U and a pair of bearing retainer portions 22Ld and 22Ld of the lower-side balancer housing member 22L with the weight portion 21a interposed therebetween.

Further, as illustrated in FIG. 2, the first balancer shaft 21R is also rotatably supported by a similar configuration.

The weight portion 21a of the first balancer shaft 21R and the weight portion 21a of the second balancer shaft 21L are positioned at heights equal to each other constantly when the first balancer shaft 21R and the second balancer shaft 21L are rotating.

Four leg portions 23 extend upward from the upper-side balancer housing member 22U of the balancer housing 22 at four front, rear, left, and right corner portions.

A shim holding hollow pin 26 protrudes upward from an upper end surface of each of the leg portions 23.

Each of the shim holding hollow pins 26 is fixedly pressure-fitted in a hole formed at each of the leg portions 23.

Further, the bearing lubrication oil passage 33 and the feedback oil passage 34 are disposed on the upper-side balancer housing member 22U of the balancer housing 22. The bearing lubrication oil passage 33 includes the bearing lubrication oil passage opening portion 33a for supplying lubrication oil from the main oil gallery 52 to the four plain bearings 30. The feedback oil passage 34 includes the feedback oil passage opening portion 34a for controlling the discharge amount of the oil pump 40.

A positioning hollow pin 27 and a positioning hollow pin 28 are press-fitted in the bearing lubrication oil passage opening portion 33a and the feedback oil passage opening portion 34a, respectively.

Four attachment holes 10c (refer to FIG. 1) and positioning holes 10d and 10e (refer to FIGS. 8 and 10) are provided on the bottom surface of the cylinder block 10. The attachment holes 10c are loosely fitted to the four shim holding hollow pins 26. The positioning holes 10d and 10e are tightly fitted to the positioning hollow pin 27 and the positioning hollow pin 28.

The positioning hollow pin 27 and the positioning hollow pin 28 each form a clearance seal portion a of the oil passage (refer to FIGS. 8 and 10) and also position the balancer apparatus 20 by being tightly fitted to the positioning holes.

Further, the discharge oil passage 35 is disposed on the upper-side balancer housing member 22U of the balancer housing 22. The discharge oil passage 35 includes the discharge oil passage opening portion 35a for supplying the oil discharged from the oil pump 40 to the main oil gallery 52.

A hollow pin 43 is also press-fitted in this discharge oil passage opening portion 35a.

A fitting hole 10f is provided on the bottom surface of the cylinder block 10 (refer to FIG. 12).

The hollow pin 43 is fittedly inserted in the fitting hole 10f via an O-ring 99 (refer to FIG. 12).

The cylinder block 10 is positioned with the aid of the positioning hollow pin 27 and the positioning hollow pin 28 in the bearing lubrication oil passage opening portion 33a and the feedback oil passage opening portion 34a, where the distance between the centers of the positioning hollow pin 27 and the positioning hollow pin 28 is the longest among the positioning hollow pin 27 in the bearing lubrication oil passage opening portion 33a, the positioning hollow pin 28 in the feedback oil passage opening portion 34a, and the hollow pin 43 in the discharge oil passage opening portion 35a.

According to this configuration, the positioning accuracy is improved due to the positioning hollow pin 27 and the positioning hollow pin 28 in the bearing lubrication oil passage opening portion 33a and the feedback oil passage opening portion 34a, where the distance between the centers is the longest, and, along therewith, the hollow pin 43 in the discharge oil passage opening portion 35a is connected to the hole 10f of the oil passage of the cylinder block 10 that is connected to the main oil gallery 52 via the O-ring 99, thereby being loosely fitted and being prevented from interfering with the positioning accuracy.

As illustrated in FIG. 4, the bearing lubrication oil passage opening portion 33a, the feedback oil passage opening portion 34a, and the discharge oil passage opening portion 35a are provided on the one side closer to the attachment surface 22Ub, where the oil pump 40 and the upper-side balancer housing member 22U of the balancer housing 22 are attached to each other, with respect to the front-rear central axis O of the balancer housing 22 in the direction of the rotational axis P of the rotor 103 of the oil pump 40.

This layout allows the bearing lubrication oil passage 33, the feedback oil passage 34, and the discharge oil passage 35 to be formed into short passages, thereby contributing to reductions in an oil leak and a pressure loss.

Further, the bearing lubrication oil passage opening portion 33a, the feedback oil passage opening portion 34a, and the discharge oil passage opening portion 35a are provided on the upper-side balancer housing member 22U of the balancer housing 22.

This layout allows the balancer apparatus 20 to be directly mounted onto the internal combustion engine 1, thereby contributing to the cut-down of a cost increase and an increase in the number of components.

Figure 6:
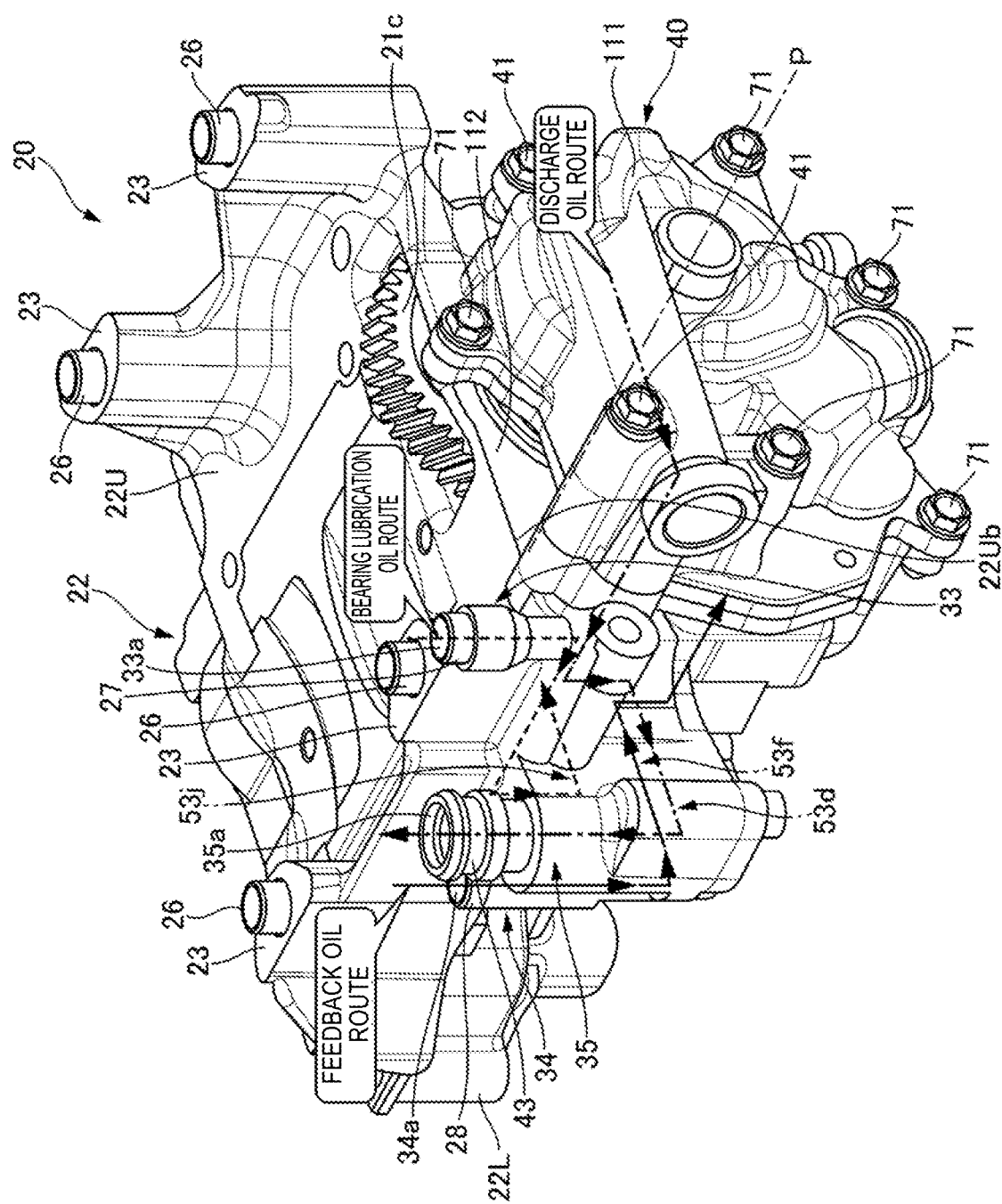
FIG. 6 is a perspective view of the balancer apparatus according to the first embodiment.

FIG. 6 indicates a bearing lubrication oil passage route (a broken line), a feedback oil passage route (a solid line), and a discharge oil passage route (an alternate long and short dash line) with arrows.

Now, an oil groove 53j of the bearing lubrication oil passage 33, an oil groove 53f of the feedback oil passage 34, and an oil groove 53d of the discharge oil passage 35 (refer to FIGS. 7 to 12), which form a part of the respective oil passages, are provided on the abutment surface between the upper-side balancer housing member 22U and the lower-side balancer housing member 22L.

The respective oil grooves are formed in an order of the oil groove 53j of the bearing lubrication oil passage, the oil groove 53f of the feedback oil passage, and the oil groove 53d of the discharge oil passage from the attachment surface 22Ub, where the pump cover 112 of the oil pump 40 and the upper-side balancer housing member 22U of the balancer housing 22 are attached to each other, toward the front-rear central axis O of the balancer housing 22 along the direction of the rotational axis P of the rotor 103 integrated with the pump shaft 102.

This layout can prevent a leak from the oil groove 53f of the feedback oil passage to thus improve the controllability of the discharge pressure of the oil pump 40, because the oil groove 53f of the feedback oil passage is formed between the oil groove 53j of the bearing lubrication oil passage 33 and the oil groove 53d of the discharge oil passage 35, which contain high-pressure oil.

Further, the balancer housing 22 includes the upper-side balancer housing member 22U on the vertically upper side that is attached to the internal combustion engine 1 and the lower-side balancer housing member 22L attached to the internal combustion engine 1 via the upper-side balancer housing member 22U in the radial direction with respect to the rotational axis P of the rotor 103 of the oil pump 40.

This configuration allows the balancer apparatus 20 to be applied to a balancer apparatus including a vertically divided housing.

Further, the oil groove 53j of the bearing lubrication oil passage 33, the oil groove 53f of the feedback oil passage 34, and the oil groove 53d of the discharge oil passage 35, which form the part of the respective oil passages, are formed on the abutment surface between the upper-side balancer housing member 22U and the lower-side balancer housing member 22L.

This layout can prevent an oil leak and also allows the balancer apparatus 20 to be formed with reduced processing, because each of the oil grooves is formed in a direction perpendicular to the direction of gravitational force.

As illustrated in FIG. 1, the balancer apparatus 20 is fixedly fastened to the cylinder block 10 with use of the bolts 25 including the leg portions 23 respectively threadably engaged with the four attachment holes 10c (two of them are illustrated in FIG. 1, and the remaining two are provided in not-illustrated similar cross section) from the lower side.

The four attachment holes 10c are arranged close to the bearing portions of the crankshaft 11.

In other words, as illustrated in FIG. 2, the four attachment holes 10c are located just beside the inter-cylinder vertical wall portions 13 and the bearing caps 14.

In this manner, when the balancer housing 22 rotatably containing the first balancer shaft 21R and the second balancer shaft 21L is attached to the bottom surface of the cylinder block 10 so as to extend over the crankshaft 11 and the bearing portions of the crankshaft 11, the crankshaft 11 and the bearing portions of the crankshaft 11 are surrounded by the balancer housing 22, the four leg portions 23, and the bottom surface of the cylinder block 10 because the four attachment holes 10c are placed close to the bearing portions of the crankshaft 11.

This surrounded space is often placed in the longitudinal direction of the internal combustion engine 1 arranged in the front-rear direction of the vehicle, i.e., the direction of the rotational axis Y of the crankshaft 11 for rear-wheel drive automobiles, and this causes a power steering unit 4 to pass through in front of the internal combustion engine 1, i.e., immediately below an opposite side of the cylinder block 10 from the flywheel 2, and thus the layout space in the oil pan 16 to be defined into a space narrow in the direction of the rotational axis Y of the crankshaft 11, but the balancer apparatus 20 can prevent the interference with the power steering unit 4 because being disposed on the rear side with respect to the center of the internal combustion engine 1 that avoids the power steering unit 4.

A C-shaped shim 17 is fastened to the outer periphery of each of the four shim holding hollow pins 26 in a held state.

This shim 17 is used to adjust a backlash between the driving gear 11a and the driven gear 21c, and is employed by being selected from shims having a plurality of thicknesses.

The oil pump 40 is fixed to the upper-side balancer housing member 22U of the balancer housing 22 with use of the two bolts 41.

The abutment surface 22Ub of the upper-side balancer housing member 22U in abutment with the oil pump 40 and the abutment surface 22Lb of the lower-side balancer housing member 22L in abutment with the oil pump 40 are machined together, and are formed so as to abut against the oil pump 40 without a space generated therebetween.

Further, as illustrated in FIG. 5, the oil pump driven gear 40a (refer to FIG. 2) is driven by the pinion gear 42 integrally rotatably attached at the rear end portion of the second balancer shaft 21L on the right side in FIG. 5 (behind the internal combustion engine 1), and the oil sucked from the intake port 132 via a not-illustrated oil strainer is discharged from the discharge port 142 and supplied to the main oil gallery 52 of the cylinder block 10 via the discharge oil passage 35 formed on the balancer housing 22.

Further, as illustrated in FIG. 8, a ball plug 4 is provided to sealingly close a processing hole of the bearing lubrication oil passage 33.

This means that the backlash between the driving gear 11a and the driven gear 21c is adjusted by the four shim holding hollow pins 26 via the shims 17.

This configuration allows the backlash between the driving gear 11a and the driven gear 21c to be adjusted by the shims 17 held in the four shim holding hollow pins 26, and also facilitates the positioning using the hollow pin 27 and the hollow pin 28, thereby facilitating the mounting onto the internal combustion engine 1.

Next, advantageous effects will be described.

The balancer apparatus 20 equipped with the oil pump according to the first embodiment brings about the following advantageous effects. (1) The bearing lubrication oil passage opening portion 33a of the bearing lubrication oil passage 33, the feedback oil passage opening portion 34a of the feedback oil passage 34, and the discharge oil passage opening portion 35a of the discharge oil passage 35 of the oil pump 40 are formed on the balancer housing 22 on the second balancer shaft 21L side closer to the main oil gallery 52, instead of on the first balancer shaft 21R side including the driven gear 21c meshed with the driving gear 11a provided on the crankshaft 11.

This layout allows a sufficiently wide space to be prepared as the space where the bearing lubrication oil passage opening portion 33a, the feedback oil passage opening portion 34a, and the discharge oil passage opening portion 35a are formed and thus facilitates the formation of the three opening portions, and, further, facilitates the connections to the holes 10d, 10e, and 10f of the oil passages of the cylinder block 10, which are provided in the internal combustion engine 1, correspond to the bearing lubrication oil passage opening portion 33a, the feedback oil passage opening portion 34a, and the discharge oil passage opening portion 35a, and are connected to the main oil gallery 52.

(2) The bearing lubrication oil passage opening portion 33a, the feedback oil passage opening portion 34a, and the discharge oil passage opening portion 35a provided on the balancer housing 22 are provided on the one side closer to the attachment surface 22Ub, where the oil pump 40 and the upper-side balancer housing member 22U of the balancer housing 22 are attached to each other, with respect to the front-rear central axis O of the balancer housing 22 in the direction of the rotational axis P of the rotor 103 of the oil pump 40.

This layout allows short passages to be formed as the bearing lubrication oil passage 33, the feedback oil passage 34, and the discharge oil passage 35, thereby contributing to reductions in an oil leak and a pressure loss.

(3) The oil groove 53*j* of the bearing lubrication oil passage 33, the oil groove 53*f* of the feedback oil passage 34, and the oil groove 53*d* of the discharge oil passage 35, which form the part of the respective oil passages, are formed on the abutment surface between the upper-side balancer housing member 22U and the lower-side balancer housing member 22L, and the respective oil grooves are formed in the order of the oil groove 53*j* of the bearing lubrication oil passage, the oil groove 53*f* of the feedback oil passage, and the oil groove 53*d* of the discharge oil passage from the attachment surface 22Ub, where the pump cover 112 of the oil pump 40 and the upper-side balancer housing member 22U of the balancer housing 22 are attached to each other, toward the front-rear central axis O of the balancer housing 22 along the direction of the rotational axis P of the rotor 103 integrated with the pump shaft 102.

This layout can prevent a leak from the oil groove 53*f* of the feedback oil passage to thus improve the controllability of the discharge pressure of the oil pump 40, because the oil groove 53*f* of the feedback oil passage is formed between the oil groove 53*j* of the bearing lubrication oil passage 33 and the oil groove 53*d* of the discharge oil passage 35, which contain the high-pressure oil.

(4) The balancer apparatus 20 includes the first balancer shaft 21R and the second balancer shaft 21L. The first balancer shaft 21R receives the rotational force of the crankshaft 11 provided in the internal combustion engine 1 that is transmitted via the driving gear 11*a*, and also includes the driven gear 21*c* meshed with the driving gear 11*a* provided on the one side closer to the attachment surface 22Ub, where the pump cover 112 of the oil pump 40 and the upper-side balancer housing member 22U of the balancer housing 22 are attached to each other, with respect to the front-rear central axis O of the balancer housing 22 in the direction of the rotational axis P of the rotor 103 of the oil pump 40. The second balancer shaft 21L is disposed between the first balancer shaft 21R, and the bearing lubrication oil passage opening portion 33*a* of the bearing lubrication oil passage 33, the feedback oil passage opening portion 34*a* of the feedback oil passage 34, and the discharge oil passage opening portion 35*a* of the discharge oil passage 35 of the oil pump 40 in the radial direction with respect to the rotational axis P of the rotor 103 of the oil pump 40. The second balancer shaft 21L transmits the rotational force of the first balancer shaft 21R to the rotor 103 of the oil pump 40. Along therewith, the balancer apparatus 20 is configured to rotate the first balancer shaft 21R and the second balancer shaft 21R in the opposite directions from each other at the double speed, thereby canceling out the centrifugal force in the left-right direction by the first balancer shaft 21R and the second balancer shaft 21L.

Therefore, the balancer apparatus 20 can be applied to a four-cylinder internal combustion engine.

(5) The balancer housing 22 includes the upper-side balancer housing member 22U on the vertically upper side that is attached to the internal combustion engine 1, and the lower-side balancer housing member 22L attached to the internal combustion engine 1 via the upper-side balancer housing member 22U in the radial direction with respect to the rotational axis P of the rotor 103 of the oil pump 40.

This configuration allows the balancer apparatus 20 to be applied to a balancer apparatus including a vertically divided housing.

(6) The balancer housing 22 includes the upper-side balancer housing member 22U on the vertically upper side that is attached to the internal combustion engine 1, and the lower-side balancer housing member 22L attached to the internal combustion engine 1 via the upper-side balancer housing member 22U in the radial direction with respect to the rotational axis P of the rotor 103 of the oil pump 40. Then, the oil groove 53*j* of the bearing lubrication oil passage 33, the oil groove 53*f* of the feedback oil passage 34, and the oil groove 53*d* of the discharge oil passage 35, which form the part of the respective oil passages, are formed on the abutment surface between the upper-side balancer housing member 22U and the lower-side balancer housing member 22L.

This layout can prevent an oil leak and also allows the balancer apparatus 20 to be formed with reduced processing, because each of the oil grooves is formed in the direction perpendicular to the direction of gravitational force.

(7) The bearing lubrication oil passage opening portion 33*a*, the feedback oil passage opening portion 34*a*, and the discharge oil passage opening portion 35*a* are provided on the upper-side balancer housing member 22U of the balancer housing 22.

This layout allows the balancer apparatus 20 to be directly mounted onto the internal combustion engine 1, thereby contributing to the cut-down of a cost increase and an increase in the number of components.

(8) The balancer apparatus 20 includes the positioning hollow pin 27 press-fitted in the bearing lubrication oil passage opening portion 33*a*, the positioning hollow pin 28 press-fitted in the feedback oil passage opening portion 34*a*, and the four shim holding hollow pins 26 holding the shims 17.

This configuration facilitates the positioning using the positioning hollow pin 27 and the positioning hollow pin 28 and thus facilitates the mounting onto the internal combustion engine 1, and also allows the backlash between the driving gear 11*a* and the driven gear 21*c* to be adjusted with use of the shims 17 held by the four shim holding hollow pins 26.

(9) Among the bearing lubrication oil passage opening portion 33*a*, the feedback oil passage opening portion 34*a*, and the discharge oil passage opening portion 35*a*, the positioning hollow pin 27 and the positioning hollow pin 28 in the bearing lubrication oil passage opening portion 33*a* and the feedback oil passage opening portion 34*a*, where the distance between the centers is the longest, are connected to the holes 10*d* and 10*e* of the oil passages of the cylinder block 10 connected to the main oil gallery 52 via the clearance seal portions a, and the hollow pin 43 in the discharge oil passage opening portion 35*a* is connected to the hole 10*f* of the oil passage of the cylinder block 10 connected to the main oil gallery 52 via the O-ring 99.

Therefore, the positioning accuracy is improved due to the positioning hollow pin 27 and the positioning hollow pin 28 in the bearing lubrication oil passage opening portion 33*a* and the feedback oil passage opening portion 34*a*, where the distance between the centers is the longest, and, along therewith, the hollow pin 43 in the discharge oil passage opening portion 35*a* is connected to the hole 10*f* of the oil passage of the cylinder block 10 that is connected to the main oil gallery 52 via the O-ring 99, thereby being loosely fitted and thus being prevented from interfering with the positioning accuracy.

Figure 13:
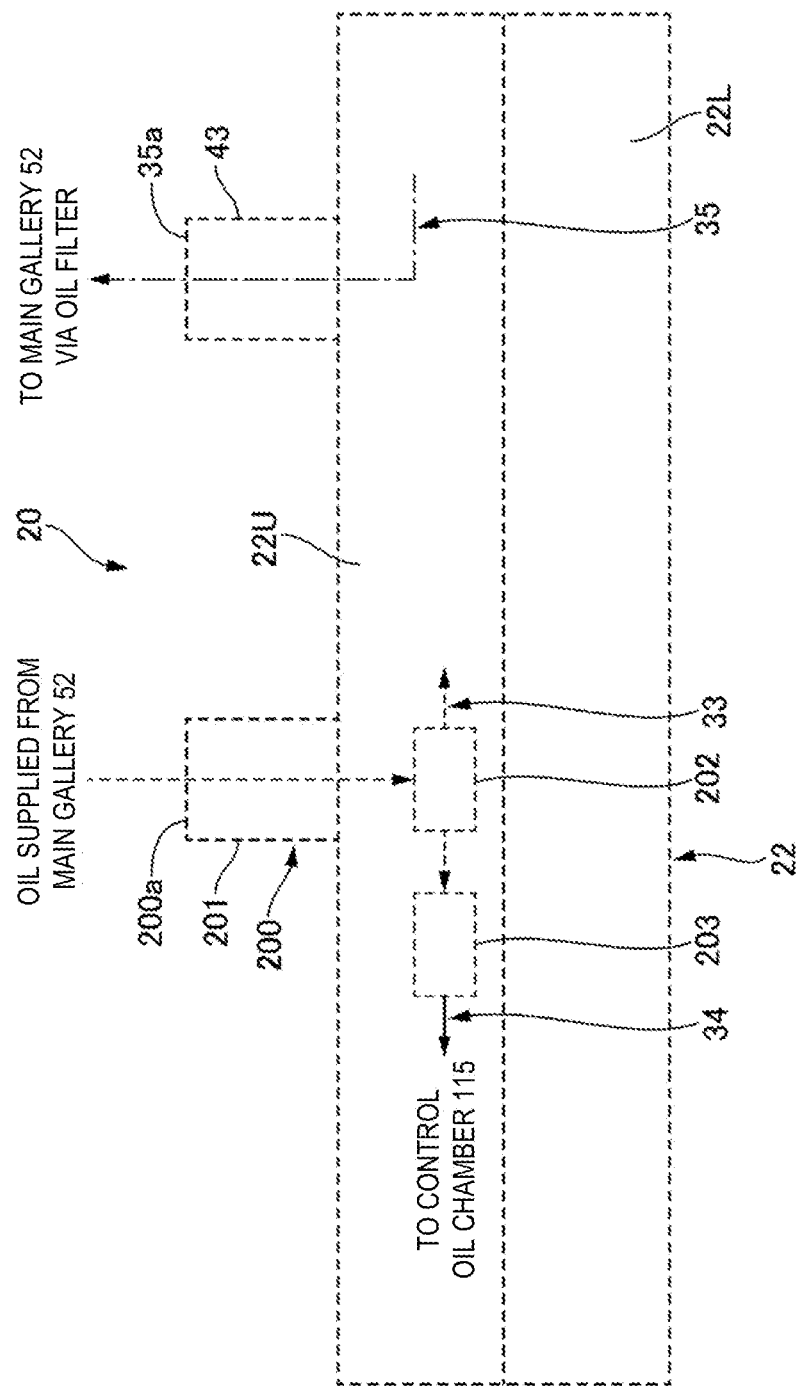
FIG. 13 is a schematic view of a balancer apparatus according to a second embodiment.

[Second Embodiment] FIG. 13 is a schematic view of a balancer apparatus according to a second embodiment.

A configuration of the balancer apparatus according to the second embodiment will be described.

Unlike the first embodiment, the balancer apparatus includes two oil passage opening portions, namely, the discharge oil passage opening portion 35a and a return oil passage opening portion 200a in which a hollow pin 201 is press-fitted. A return oil passage 200 and thus the oil therein branch into the bearing lubrication oil passage 33 and the feedback oil passage 34 by a branch valve 202 in the balancer housing 22. The oil is supplied into the control oil chamber 115 after the pressure thereof is adjusted by a pressure adjustment valve 203 in the feedback oil passage 34. Except for these differences, the second embodiment is configured similarly to the first embodiment, and therefore the same reference numerals are assigned to similar components and descriptions thereof will be omitted here.

Therefore, in addition to the advantageous effects of the first embodiment, the present configuration includes the two oil passage opening portions and therefore also includes two holes of oil passages of the cylinder block 10 that are connected to the main oil gallery 52 of the internal combustion engine 1, thereby further facilitating the connection of the balancer apparatus 20 to the internal combustion engine 1.

[Other Embodiments] Having described the embodiments for implementing the present invention, the specific configuration of the present invention is not limited to the configurations of the embodiments, and the present invention also includes a design modification and the like thereof made within a range that does not depart from the spirit of the present invention, if any.

For example, the balancer housing 22 has been described as being vertically divided in half in the embodiments, but may be horizontally divided in half.

Further, the hollow pins 27, 28, and 43 are press-fitted in the balancer housing 22, but may be press-fitted in the holes 10d, 10e, and 10f of the oil passages of the cylinder block 10.

In the following description, technical ideas recognizable from the above-described embodiments will be described.

A balancer apparatus equipped with an oil pump, according to one embodiment thereof, includes a pump housing including a pump containing chamber provided therein, a pump forming member contained in the pump containing chamber and configured to discharge oil introduced from an intake portion from a discharge portion to an oil passage of the internal combustion engine when a rotational force is transmitted thereto, a control oil chamber provided between the pump containing chamber and the pump forming member in a radial direction with respect to a rotational axis of the pump forming member and configured to change a hydraulic pressure of the oil to be discharged from the pump forming member with the aid of the oil introduced therein after being discharged from the discharge portion, passing through an oil passage of the internal combustion engine, and being subjected to a pressure adjustment, and a balancer housing including a bearing retainer portion configured to transmit the rotational force from the internal combustion engine to the pump forming member. The bearing retainer portion supports a balancer shaft disposed along the rotational axis of the pump forming member. The balancer housing is attached to the pump housing in a direction of the rotational axis of the pump forming member. The balancer apparatus equipped with the oil pump further includes a plurality of oil passage opening portions formed together on one side surface of the balancer housing and each connected to an oil passage connected to a main oil gallery of the internal combustion engine. The plurality of oil passage opening portions includes a discharge oil passage opening portion of a discharge oil passage connecting the discharge portion and the main oil gallery of the internal combustion engine to each other, a feedback oil passage opening portion of a feedback oil passage connecting the main oil gallery of the internal combustion engine and the control oil chamber to each other, and a bearing oil passage opening portion of a bearing oil passage connecting the main oil gallery of the internal combustion engine and the bearing retainer portion to each other.

According to a further preferable embodiment, in the above-described embodiment, the plurality of oil passage opening portions is provided on one side closer to an attachment surface, where the pump housing and the balancer housing are attached to each other, with respect to a front-rear central axis of the balancer housing in the direction of the rotational axis of the pump forming member.

According to a further preferable embodiment, in the above-described embodiment, the balancer housing includes a first balancer housing and a second balancer housing. Respective oil grooves forming a part of the bearing lubrication oil passage, a part of the feedback oil passage, and a part of the discharge oil passage are formed on an abutment surface between the first balancer housing and the second balancer housing in an order of the oil groove forming the part of the bearing oil passage, the oil groove forming the part of the feedback oil passage, and the oil groove forming the part of the discharge oil passage along the rotational axis of the pump forming member.

According to further another preferable embodiment, in any of the above-described embodiments, the balancer shaft includes a first balancer shaft configured to receive a rotational force of a crankshaft provided in the internal combustion engine that is transmitted via a driving gear and also including a driven gear meshed with the driving gear provided on one side closer to an attachment surface, where the pump housing and the balancer housing are attached to each other, with respect to a front-rear central axis of the balancer housing in the direction of the rotational axis of the pump forming member, and a second balancer shaft disposed between the first balancer shaft and the plurality of oil passage opening portions in the radial direction with respect to the rotational axis of the pump forming member and configured to transmit a rotational force of the first balancer shaft to the pump forming member.

According to further another preferable embodiment, in any of the above-described embodiments, the balancer housing includes a first balancer housing on a vertically upper side that is attached to the internal combustion engine in the radial direction with respect to the rotational axis of the pump forming member, and a second balancer housing on a vertically lower side that is attached to the internal combustion engine via the first balancer housing in the radial direction with respect to the rotational axis of the pump forming member.

According to further another preferable embodiment, in the above-described embodiment, respective oil grooves forming a part of the discharge oil passage, a partial oil passage of the feedback oil passage, and a part of the bearing oil passage are formed on an abutment surface between the first balancer housing on the vertically upper side and the second balancer housing on the vertically lower side.

According to further another preferable embodiment, in the above-described embodiment, the oil grooves are formed on the abutment surface between the first balancer housing on the vertically upper side and the second balancer housing on the vertically lower side in an order of the oil groove forming the part of the bearing oil passage, the oil groove forming the part of the feedback oil passage, and the oil groove forming the part of the discharge oil passage along the direction of the rotational axis of the pump forming member.

According to further another preferable embodiment, in the above-described embodiment, the pump housing is attached to the first balancer housing on the vertically upper side. At least one of the discharge oil passage opening portion, the feedback oil passage opening portion, and the bearing oil passage opening portion is provided on the first balancer housing on the vertically upper side.

According to further another preferable embodiment, in any of the above-described embodiments, a hollow cylindrical member is provided in at least one of the discharge oil passage opening portion, the feedback oil passage opening portion, and the bearing oil passage opening portion.

According to further another preferable embodiment, in the above-described embodiment, the hollow cylindrical member is press-fitted in each of the discharge oil passage opening portion, the feedback oil passage opening portion, and the bearing oil passage opening portion.

According to further another preferable embodiment, in the above-described embodiment, the hollow cylindrical members in two opening portions where a distance between respective centers is the longest, among the discharge oil passage opening portion, the feedback oil passage opening portion, and the bearing oil passage opening portion, are each connected to an oil passage connected to the main oil gallery of the internal combustion engine via a clearance seal. The hollow cylindrical member in the remaining one opening portion is connected to an oil passage connected to the main oil gallery of the internal combustion engine via an O-ring.

A balancer apparatus equipped with an oil pump, according to one embodiment thereof, is configured to be fixed to an internal combustion engine. The oil pump is attached to this balancer apparatus equipped with the oil pump. The oil pump includes a pump housing including a pump containing chamber provided therein, a pump forming member contained in the pump containing chamber and configured to discharge oil introduced from an intake portion from a discharge portion to an oil passage of the internal combustion engine when a rotational force is transmitted thereto, and a control oil chamber provided between the pump containing chamber and the pump forming member in a radial direction with respect to a rotational axis of the pump forming member and configured to change a hydraulic pressure of the oil to be discharged from the pump forming member with the aid of the oil introduced therein after being discharged from the discharge portion, passing through an oil passage of the internal combustion engine, and being subjected to a pressure adjustment. The balancer apparatus equipped with the oil pump includes a balancer housing including a bearing retainer portion configured to transmit the rotational force from the internal combustion engine to the pump forming member. The bearing retainer portion supports a balancer shaft disposed along the rotational axis of the pump forming member. The balancer housing is attached to the pump housing in a direction of the rotational axis of the pump forming member. The balancer apparatus equipped with the oil pump further includes a plurality of oil passage opening portions formed on the balancer housing and also opened toward a main oil gallery of the internal combustion engine. The plurality of oil passage opening portions is each connected to the oil passage of the internal combustion engine. The plurality of oil passage opening portions includes a discharge oil passage opening portion of a discharge oil passage connecting the discharge portion and the main oil gallery of the internal combustion engine to each other, and a return oil passage opening portion of a return oil passage connected to between the main oil gallery and at least one of the control oil chamber and the bearing portion.

The present invention is not limited to the above-described embodiments, and includes various modifications. For example, the above-described embodiments have been described in detail to facilitate better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2019-169208 filed on Sep. 18, 2019. The entire disclosure of Japanese Patent Application No. 2019-169208 filed on Sep. 18, 2019 including the specification, the claims, the drawings, and the abstract is incorporated herein by reference in its entirety.

REFERENCE SIGNS LIST 1 internal combustion engine
11 crankshaft
11a driving gear
20 balancer apparatus
21c driven gear
21c1 end surface of the driven gear on the pump housing side
21R first balancer shaft
21L second balancer shaft
22 balancer housing
22U upper-side balancer housing member (first balancer housing)
22L lower-side balancer housing member (second balancer housing)
22Le abutment surface between the upper-side balancer housing and the lower-side balancer housing
22Ub attachment surface between the pump housing and the balancer housing
22Ud bearing retainer portion
22Ld bearing retainer portion
27 bearing lubrication hollow pin
28 feedback oil passage hollow pin
30 plain bearing (sliding bearing)
33 bearing lubrication oil passage
33a bearing lubrication oil passage opening portion
34 feedback oil passage
34a feedback oil passage opening portion
35 discharge oil passage
35a discharge oil passage opening portion
43 discharge oil passage hollow pin
40 oil pump 52 main oil gallery
53d oil groove of the discharge oil passage
53f feedback oil passage
53j oil groove of the bearing lubrication oil passage
99 O-ring
103 rotor (pump forming member)
104 cam ring (pump forming member)
105 vane (pump forming member)
111 pump body (pump housing)
112 pump cover (pump housing)
115 control oil chamber
1119 pump containing chamber
132 intake port (intake portion)
142 discharge port (discharge portion)
200 return oil passage
200a return oil passage opening portion
a clearance seal portion
O front-rear central axis of the balancer housing
P rotational axis of the rotor
Q left-right central axis of the internal combustion engine

The invention claimed is:

1. A balancer apparatus equipped with an oil pump that is configured to be mounted on an internal combustion engine, the balancer apparatus equipped with the oil pump comprising:
   a pump housing including a pump containing chamber provided therein;
   a pump forming member contained in the pump containing chamber and configured to discharge oil introduced from an intake portion from a discharge portion to an oil passage of the internal combustion engine when a rotational force is transmitted thereto;
   a control oil chamber provided between the pump containing chamber and the pump forming member in a radial direction with respect to a rotational axis of the pump forming member, the control oil chamber being configured to change a hydraulic pressure of the oil to be discharged from the pump forming member with the aid of the oil introduced therein after being discharged from the discharge portion, passing through an oil passage of the internal combustion engine, and being subjected to a pressure adjustment;
   a balancer housing including a bearing retainer portion configured to transmit the rotational force from the internal combustion engine to the pump forming member, the bearing retainer portion supporting a balancer shaft disposed along the rotational axis of the pump forming member, the balancer housing being attached to the pump housing in a direction of the rotational axis of the pump forming member; and
   a plurality of oil passage opening portions formed together on one side surface of the balancer housing and each connected to an oil passage connected to a main oil gallery of the internal combustion engine, the plurality of oil passage opening portions including a discharge oil passage opening portion of a discharge oil passage connecting the discharge portion and the main oil gallery of the internal combustion engine to each other, a feedback oil passage opening portion of a feedback oil passage connecting the main oil gallery of the internal combustion engine and the control oil chamber to each other, and a bearing oil passage opening portion of a bearing oil passage connecting the main oil gallery of the internal combustion engine and the bearing retainer portion to each other.

2. The balancer apparatus equipped with the oil pump according to claim 1, wherein the plurality of oil passage opening portions is provided on one side closer to an attachment surface, where the pump housing and the balancer housing are attached to each other, with respect to a left-right central axis of the balancer housing in the direction of the rotational axis of the pump forming member.

3. The balancer apparatus equipped with the oil pump according to claim 2, wherein the balancer housing includes a first balancer housing and a second balancer housing,
   wherein respective oil grooves forming a part of the bearing lubrication oil passage, a part of the feedback oil passage, and a part of the discharge oil passage are formed on an abutment surface between the first balancer housing and the second balancer housing in an order of the oil groove forming the part of the bearing oil passage, the oil groove forming the part of the feedback oil passage, and the oil groove forming the part of the discharge oil passage along the rotational axis of the pump forming member.

4. The balancer apparatus equipped with the oil pump according to claim 1, wherein the balancer shaft includes
   a first balancer shaft configured to receive a rotational force of a crankshaft provided in the internal combustion engine that is transmitted via a driving gear, the first balancer shaft also including a driven gear meshed with the driving gear provided on one side closer to an attachment surface, where the pump housing and the balancer housing are attached to each other, with respect to a left-right central axis of the balancer housing in the direction of the rotational axis of the pump forming member, and
   a second balancer shaft disposed between the first balancer shaft and the plurality of oil passage opening portions in the radial direction with respect to the rotational axis of the pump forming member, the second balancer shaft being configured to transmit a rotational force of the first balancer shaft to the pump forming member.

5. The balancer apparatus equipped with the oil pump according to claim 1, wherein the balancer housing includes
   a first balancer housing on a vertically upper side that is attached to the internal combustion engine in the radial direction with respect to the rotational axis of the pump forming member, and
   a second balancer housing on a vertically lower side that is attached to the internal combustion engine via the first balancer housing in the radial direction with respect to the rotational axis of the pump forming member.

6. The balancer apparatus equipped with the oil pump according to claim 5, wherein respective oil grooves forming a part of the discharge oil passage, a part of the feedback oil passage, and a part of the bearing oil passage are formed on an abutment surface between the first balancer housing on the vertically upper side and the second balancer housing on the vertically lower side.

7. The balancer apparatus equipped with the oil pump according to claim 6, wherein the oil grooves are formed on the abutment surface between the first balancer housing on the vertically upper side and the second balancer housing on the vertically lower side in an order of the oil groove forming the part of the bearing oil passage, the oil groove forming the part of the feedback oil passage, and the oil groove forming the part of the discharge oil passage along the direction of the rotational axis of the pump forming member.

8. The balancer apparatus equipped with the oil pump according to claim 7, wherein the pump housing is attached to the first balancer housing on the vertically upper side, and
wherein at least one of the discharge oil passage opening portion, the feedback oil passage opening portion, and the bearing oil passage opening portion is provided on the first balancer housing on the vertically upper side.

9. The balancer apparatus equipped with the oil pump according to claim 1, wherein a hollow cylindrical member is provided in at least one of the discharge oil passage opening portion, the feedback oil passage opening portion, and the bearing oil passage opening portion.

10. The balancer apparatus equipped with the oil pump according to claim 9, wherein the hollow cylindrical member is press-fitted in each of the discharge oil passage opening portion, the feedback oil passage opening portion, and the bearing oil passage opening portion.

11. The balancer apparatus equipped with the oil pump according to claim 10, wherein the hollow cylindrical members in two opening portions where a distance between respective centers is the longest, among the discharge oil passage opening portion, the feedback oil passage opening portion, and the bearing oil passage opening portion, are each connected to an oil passage connected to the main oil gallery of the internal combustion engine via a clearance seal, and
wherein the hollow cylindrical member in the remaining one opening portion is connected to an oil passage connected to the main oil gallery of the internal combustion engine via an O-ring.

12. A balancer apparatus equipped with an oil pump, the balancer apparatus equipped with the oil pump being configured to be fixed to an internal combustion engine, the oil pump being attached to the balancer apparatus equipped with the oil pump,
the oil pump including
a pump housing including a pump containing chamber provided therein,
a pump forming member contained in the pump containing chamber and configured to discharge oil introduced from an intake portion from a discharge portion to an oil passage of the internal combustion engine when a rotational force is transmitted thereto, and
a control oil chamber provided between the pump containing chamber and the pump forming member in a radial direction with respect to a rotational axis of the pump forming member, the control oil chamber being configured to change a hydraulic pressure of the oil to be discharged from the pump forming member with the aid of the oil introduced therein after being discharged from the discharge portion, passing through an oil passage of the internal combustion engine, and being subjected to a pressure adjustment,
the balancer apparatus equipped with the oil pump comprising:
a balancer housing including a bearing retainer portion configured to transmit the rotational force from the internal combustion engine to the pump forming member, the bearing retainer portion supporting a balancer shaft disposed along the rotational axis of the pump forming member, the balancer housing being attached to the pump housing in a direction of the rotational axis of the pump forming member; and
a plurality of oil passage opening portions formed on the balancer housing and also opened toward a main oil gallery of the internal combustion engine, the plurality of oil passage opening portions being each connected to the oil passage of the internal combustion engine, the plurality of oil passage opening portions including a discharge oil passage opening portion of a discharge oil passage connecting the discharge portion and the main oil gallery of the internal combustion engine to each other, and a return oil passage opening portion of a return oil passage connected to between the main oil gallery and at least one of the control oil chamber and the bearing portion.

* * * * *